United States Patent
Pelfrey

Patent Number: 5,848,259
Date of Patent: Dec. 8, 1998

[54] METHOD AND APPARATUS FOR DATA CORRELATION

[76] Inventor: Lowell S. Pelfrey, 970 ½ Via Carmelitas, Long Beach, Calif. 90805

[21] Appl. No.: 294,336

[22] Filed: Aug. 23, 1994

[51] Int. Cl.$^6$ ..................................................... G06F 17/00

[52] U.S. Cl. ............................................................ 345/440

[58] Field of Search ....................... 395/140; 364/413.01; 345/440

[56] References Cited

PUBLICATIONS

Shanks et al. "Calculus Analytic Geometry/Elementary Functions" p. 152–171, 1973.
Ryan, Daniel L. Computer—Aided Graphics and Design. 1985.

*Primary Examiner*—Almis R. Jankus

[57] ABSTRACT

Herein is described a method for presenting large quantities of data using only a simple co-ordinate system. When this method is used, the relationship between parameters can be shown, and made subject to analysis, even if the parameters are obtained from different disciplines. For instance, a complete record of results of blood analyses for several years can be presented on a single sheet of paper.

2 Claims, 1 Drawing Sheet

METHOD AND APPARATUS FOR DATA CORRELATION

SUMMARY

Correlating data involving changes in values of parameters with time can be inefficient and laborious if this correlation is done using only the data sheets on which these data are reported. A common example of such data is the conventional medical blood-test report. If the method described in this invention is used, the nature of the relationship between parameters can be shown immediately, and a compact, condensed record of their behavior is subject to analysis.

DESCRIPTION OF ENCLOSED EMBODIMENTS

Figure 1:
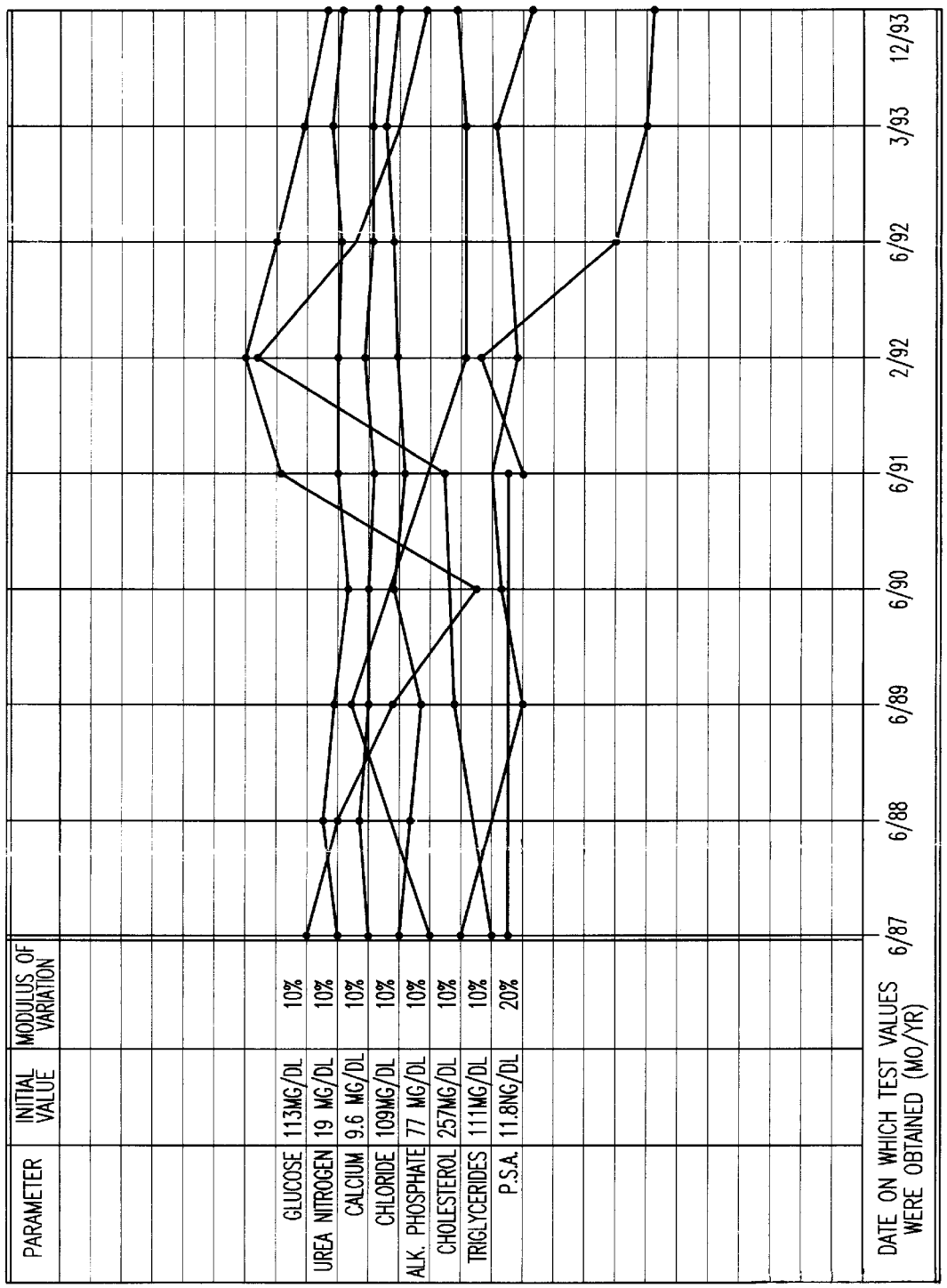
FIG. 1 is a diagram illustrating the disclosed invention.

Referring to FIG. 1, two sets of parallel straight lines which are mutually perpendicular, the spaces between one of these sets of lines are used to denote intervals of time, and the spaces between the lines of the other set are used to denote the relative changes in the value of the parameters with respect to the initial value of said parameters. The point of intersection of the lower line of the space assigned to the name of the parameter and the line corresponding to the date on which the data was obtained is the beginning of the plot for a given parameter. Succeeding points will lie on the lines which are designated as the dates of the tests, and will be at the appropriate distance above or below the "Initial Value" line. If the value of a parameter on a given test is less than the initial value, the point should be placed at the appropriate distance below the initial value; conversely, a value greater than the initial value should be placed the appropriate distance above it.

In FIG. 1 actual data from an individual's blood tests have been plotted. It can be seen that most of the large parameter variations occurred before and after the individual was given X-radiation therapy for prostate cancer. This therapy was given in May, June 1992.

Also, it should be noted that data representing diverse fields of technology can be plotted on the same system of lines.

What is claimed is:

1. A method for correlating data involving changes in the values of a plurality of parameters, using two mutually perpendicular sets of parallel straight lines, comprising:

assigning sequential time values to one set of parallel straight lines;

assigning an initial value for each respective parameter to a respective line of the other set of parallel straight lines;

also, assigning a modulus of variation for each parameter;

for each parameter, plotting percentage changes for the value of each parameter, time sequentially, such that each line of the said other set of parallel straight lines corresponds to an integral multiple of that parameters modulus of variation;

wherein the nature of the relationship between parameters can be correlated immediately.

2. An apparatus for correlating data involving changes in the values of a plurality of parameters, using two mutually perpendicular sets of parallel straight lines, comprising:

means for assigning sequential time values to one set of parallel straight lines;

means for assigning an initial value for each respective parameter to a respective line of the other set of parallel straight lines;

also, means for assigning a modulus of variation for each parameter;

for each parameter, means for plotting percentage changes for the value of each parameter, time sequentially, such that each line of the said other set of parallel straight lines corresponds to an integral multiple of that parameters modulus of variation;

wherein the nature of the relationship between parameters can be correlated immediately.

* * * * *